United States Patent
Chung et al.

(10) Patent No.: US 7,430,244 B2
(45) Date of Patent: Sep. 30, 2008

(54) CONSTELLATION-ROTATING ORTHOGONAL SPACE-TIME BLOCK CODING TECHNIQUE

(75) Inventors: Jae-Hak Chung, Seoul (KR);
Kyung-Whoon Cheun, Seoul (KR);
Tae-Jin Jung, Daejeon (KR)

(73) Assignees: Samsung Electronics Co., Ltd (KR);
Seoul National University Industry Foundation (KR)

( * ) Notice: Subject to any disclaimer, the term of this patent is extended or adjusted under 35 U.S.C. 154(b) by 658 days.

(21) Appl. No.: 11/003,221

(22) Filed: Dec. 3, 2004

(65) Prior Publication Data
US 2005/0163243 A1    Jul. 28, 2005

(30) Foreign Application Priority Data
Dec. 24, 2003    (KR)    ............... 10-2003-0096818

(51) Int. Cl.
*H04L 1/02*    (2006.01)
(52) U.S. Cl. .................................... 375/267
(58) Field of Classification Search ......... 375/260–261, 375/267, 285, 299; 370/210, 234
See application file for complete search history.

(56) References Cited

U.S. PATENT DOCUMENTS 7,224,744 B2 * 5/2007 Giannakis et al. ........... 375/267
2003/0235146 A1 * 12/2003 Wu et al. .................... 370/203
2005/0078761 A1 * 4/2005 Hottinen et al. ............. 375/267

OTHER PUBLICATIONS

Yan Xin, Zhengdao Wang and Georgios B. Giannakis, Space-Time Constellation-Rotating Codes Maximizing Diversity and Coding Gains, IEEE 2001.*
Alamouti, Telecommunication Review, vol. 12, 2nd Edition, Mar.-Apr. 2002.

* cited by examiner

*Primary Examiner*—Khanh C Tran
(74) *Attorney, Agent, or Firm*—The Farrell Law Firm, PC

(57) ABSTRACT

A coding technique for achieving a maximum diversity gain in a wireless communication system having a transmitter for transmitting data on a fading channel through a plurality of transmit antennas and a receiver for receiving the data through a plurality of receive antennas. In the coding technique, P $m^{th}$-order sub-rotated vectors $\vec{r}_i$ are generated by constellation-rotating an $L^{th}$-order input vector $\vec{x}$ including a plurality of input symbols modulated in at least one modulation scheme. m $p^{th}$-order sub-vectors $\vec{u}_i$ are generated using the sub-rotated vectors $\vec{r}_i$. Codeword matrices $A_i(\vec{u}_i)$ are generated by performing orthogonal space-time block coding on the sub-vectors $\vec{u}_i$ and then transmitted through the transmit antennas.

40 Claims, 4 Drawing Sheets

CONSTELLATION-ROTATING ORTHOGONAL SPACE-TIME BLOCK CODING TECHNIQUE

PRIORITY

This application claims priority under 35 U.S.C. § 119 to an application entitled "Constellation-Rotating Orthogonal Space-Time Block Coding Technique" filed in the Korean Intellectual Property Office on Dec. 24, 2003 and assigned Serial No. 2003-96818, the contents of which are incorporated herein by reference.

BACKGROUND OF THE INVENTION

1. Field of the Invention

The present invention relates generally to a wireless communication system, and in particular, to a coding technique with maximum diversity gain in a multiple antenna transmission system.

2. Description of the Related Art

As a way to improve the performance of mobile communication systems under a fading channel environment, many studies have been conducted on transmit antenna diversity with which data is transmitted through multiple antennas. Transmit antenna diversity, which provides diversity gain using a plurality of transmit antennas, is suitable for future-generation high-speed data communication. To achieve the transmit antenna diversity gain, various channel coding techniques have been proposed.

Orthogonal space-time block codes (STBCs) that are based on an orthogonal design theory is one example of a technique of achieving optimum transmit antenna diversity gain. The orthogonal STBCs advantageously have a maximum diversity order and enable maximum likelihood (ML) decoding through simple linear processing on a receiver side.

However, the orthogonal STBCs, without using additional frequency bands, exist for an arbitrary number of antennas for pulse amplitude modulation (PAM), and exist only for two transmit antennas for quadrature amplitude modulation (QAM).

Aside from the orthogonal STBCs, a new full rate diversity structure has been proposed that provides maximum diversity gain in QAM, under a Raleigh fading channel environment. This diversity structure achieves spatial diversity gain by rotating the constellation of QAM modulation symbols through a constellation-rotating pre-coder and interleaving the resulting symbols. A full rate space-time constellation-rotating code was proposed by modifying the diversity structure. Signals from the constellation-rotating pre-coder are transmitted through a plurality of transmit antennas for different symbol periods such that they separately experience fading.

However, the full rate space-time constellation-rotating codes are not orthogonal and increase ML detection complexity for detecting the space-time constellation-rotating codes exponentially in proportion to the number of transmit antennas and the size of the symbol constellation.

SUMMARY OF THE INVENTION

Therefore, the present invention has been designed to substantially solve at least the above problems and/or disadvantages and to provide at least the advantages below. Accordingly, an object of the present invention is to provide a space-time block coding apparatus and method for achieving maximum diversity gain by directly concatenating a constellation-rotating precoder to an orthogonal space-time block coder when a QAM is utilized and two or more transmit antennas are used.

Another object of the present invention is to provide a space-time block coding apparatus and method for achieving maximum coding gain by using Alamouti's orthogonal space-time block code.

A further object of the present invention is to provide a space-time block coding apparatus and method for enabling code detection without rapidly increasing ML complexity, while achieving maximum coding gain.

The above and other objects are achieved by providing a space-time block coding apparatus and method for achieving a maximum diversity gain in a wireless communication system having a transmitter for transmitting data on a fading channel through a plurality of transmit antennas and a receiver for receiving the data through a plurality of receive antennas.

In the space-time block coding apparatus, a constellation-rotating precoder generates P $m^{th}$-order sub-rotated vectors $\vec{r}_i$ by constellation-rotating an $L^{th}$-order input vector $\vec{x}$ including a plurality of input symbols modulated in at least one modulation scheme, an accumulator generates m $p^{th}$-order sub-vectors $\vec{u}_i$ using the sub-rotated vectors $\vec{r}_i$, and a space-time block coder generates codeword matrices $A_i(\vec{u}_i)$ by performing orthogonal space-time block coding on the sub-vectors $\vec{u}_i$.

The constellation-rotating precoder includes a first accumulation module for generating P $m^{th}$-order sub-input vectors $\vec{x}_i$ by grouping the symbols of the input vector $\vec{x}$ into P groups each having m symbols, and outputting the P $m^{th}$-order sub-input vectors $\vec{x}_i$ in parallel, and a plurality of constellation rotators for generating the P $m^{th}$-order sub-rotated vectors $\vec{r}_i$ by multiplying the parallel P $m^{th}$-order sub-input vectors $\vec{x}_i$ by a constellation-rotating matrix $\Theta$.

The accumulator includes a plurality of extraction modules for extracting signals $r_{i,j}$ included in each of the sub-rotated vectors $\vec{r}_i$ received from the constellation-rotating precoder, and a second accumulation module for generating the m $p^{th}$-order sub-vectors $\vec{u}_i$ by grouping the extracted signals $r_{i,j}$.

The space-time block coder includes a plurality of orthogonal space-time coder modules for generating the codeword matrices $A_i(\vec{u}_i)$ by performing orthogonal space-time block coding on the sub-vectors $\vec{u}_i$ received from the accumulator, and a mapper for mapping the codeword matrices $A_i(\vec{u}_i)$ to the plurality of the transmit antennas.

The space-time block coder transmits the columns of each of the codeword matrices $A_i(\vec{u}_i)$ through different transmit antennas for the same symbol period, and transmits the columns of different codeword matrices $A_i(\vec{u}_i)$ through different transmit antennas for different symbol periods.

In the space-time block coding method, P $m^{th}$-order sub-rotated vectors $\vec{r}_i$ are generated by constellation-rotating an $L^{th}$-order input vector $\vec{x}$ including a plurality of input symbols modulated in at least one modulation scheme (step 1), m $p^{th}$-order sub-vectors $\vec{u}_i$ are generated using the sub-rotated vectors $\vec{r}_i$ (step 2), and codeword matrices $A_i(\vec{u}_i)$ are generated by performing orthogonal space-time block coding on the sub-vectors $\vec{u}_i$ (step 3).

In step 1, P $m^{th}$-order sub-input vectors $\vec{x}_i$ are generated by grouping the symbols of the input vector $\vec{x}$ into P groups each having m symbols, and outputting the P $m^{th}$-order sub-input vectors $\vec{x}_i$ in parallel. The P $m^{th}$-order sub-rotated vectors $\vec{r}_i$ are generated by multiplying the parallel P $m^{th}$-order sub-input vectors $\vec{x}_i$ by a constellation-rotating matrix $\Theta$.

In step 2, signals $r_{i,j}$ included in each of the sub-rotated vectors $\vec{r}_i$ are extracted. The m $p^{th}$-order sub-vectors $\vec{u}_i$ are generated by grouping the extracted signals $r_{i,j}$. In step 3, the codeword matrices $A_i(\vec{u}_i)$ are generated by performing orthogonal space-time block coding on the sub-vectors $\vec{u}_i$ and mapped to the plurality of the transmit antennas.

The columns of each of the codeword matrices $A_i(\vec{u}_i)$ are transmitted through different transmit antennas for the same symbol period, and the columns of different codeword matrices $A_i(\vec{u}_i)$ are transmitted through different transmit antennas for different symbol periods.

A T×N codeword matrix $C(\vec{x})$ is formed using the codeword matrices $A_i(\vec{u}_i)$, to be transmitted for N transmit antennas for T symbol periods.

The T×N codeword matrix $C(\vec{x})$ is formed to be $$C(\vec{x}) \stackrel{\Delta}{=} [\vec{c}_1, \ldots, \vec{c}_N]$$

$$= \begin{bmatrix} A_1(\vec{u}_1) & 0_{n \times T_0} & \cdots & 0_{n \times T_0} \\ 0_{n \times T_0} & A_2(\vec{u}_2) & \cdots & 0_{n \times T_0} \\ \vdots & \vdots & \ddots & \vdots \\ 0_{n \times T_0} & 0_{n \times T_0} & \cdots & A_m(\vec{u}_m) \end{bmatrix}$$

where $0_{n \times T_0}$ denotes an $n \times T_0$ zero matrix and $\vec{c}_i$ denotes an $i^{th}$ column of $C(\vec{x})$.

A modified T×N codeword matrix $C(\vec{x})' \stackrel{\Delta}{=} UC(\vec{x})V$ is formed by multiplying the codeword matrix $C(\vec{x})$ by a T×T unitary matrix U and an N×N unitary matrix V at the left and right of $C(\vec{x})$ and transmitted through the N transmit antennas for the T symbol periods.

$N=2^n$, Alamouti's code is used for the orthogonal space-time block coding, and for the constellation rotation, the following matrix is used:

$$\Theta = \frac{1}{\sqrt{N}} \begin{bmatrix} 1 & \alpha_0 & \cdots & \alpha_0^{N-1} \\ 1 & \alpha_1 & \cdots & \alpha_1^{N-1} \\ \vdots & \vdots & \ddots & \vdots \\ 1 & \alpha_{N-1} & \cdots & \alpha_{N-1}^{N-1} \end{bmatrix}$$

The unitary matrices U and V are respectively $$U = \begin{bmatrix} I_2 & I_2 & I_2 & \cdots & I_2 \\ I_2 & \theta & \theta^2 & \cdots & \theta^{N-1} \\ I_2 & \theta^2 & \theta^4 & \cdots & \theta^{(N-1)2} \\ \vdots & \vdots & \vdots & \ddots & \vdots \\ I_2 & \theta^{N-1} & \theta^{2(N-1)} & \cdots & \theta^{(N-1)^2} \end{bmatrix}^*$$

and $$V = \begin{bmatrix} I_2 & I_2 & I_2 & \cdots & I_2 \\ I_2 & \theta & \theta^2 & \cdots & \theta^{N-1} \\ I_2 & \theta^2 & \theta^4 & \cdots & \theta^{(N-1)2} \\ \vdots & \vdots & \vdots & \ddots & \vdots \\ I_2 & \theta^{N-1} & \theta^{2(N-1)} & \cdots & \theta^{(N-1)^2} \end{bmatrix}$$

where $I_2$ is a $2 \times 2$ unitary matrix and $\theta \stackrel{\Delta}{=} \begin{bmatrix} e^{i4\pi/N} & 0 \\ 0 & e^{-i4\pi/N} \end{bmatrix}$.

The codeword matrix $C(\vec{x})' \stackrel{\Delta}{=} UC(\vec{x})V$ is formed to be $$C(\vec{x})' = U \begin{bmatrix} C_{Ala}(r_1, r_{N/2+1}) & 0_2 & \cdots & 0_2 \\ 0_2 & C_{Ala}(r_1, r_{N/2+2}) & \cdots & 0_2 \\ \vdots & \vdots & \ddots & \vdots \\ 0_2 & 0_2 & \cdots & C_{Ala}(r_{N/2}, r_N) \end{bmatrix} V$$

$$= \begin{bmatrix} C_{Ala}(s_1, s_{N/2+1}) & C_{Ala}(s_{N/2}, s_N) & \cdots & C_{Ala}(s_2, s_{N/2+2}) \\ C_{Ala}(s_2, s_{N/2+2}) & C_{Ala}(s_1, s_{N/2+1}) & \cdots & C_{Ala}(s_3, s_{N/2+3}) \\ \vdots & \vdots & \ddots & \vdots \\ C_{Ala}(s_{N/2}, s_N) & C_{Ala}(s_{N/2-1}, s_{N-1}) & \cdots & C_{Ala}(s_1, s_{N/2+1}) \end{bmatrix}$$

where $C_{Ala}(a, b) \stackrel{\Delta}{=} \begin{bmatrix} a & b \\ -b^* & a^* \end{bmatrix}$, $s_l = e^{i(l-1)\pi/N} x_l$, and $s_{N/2+l} = e^{i(l-1)\pi/N} x_{N/2+l}$ ($l = 1, \ldots, N/2$).

If the number of the transmit antennas is (N−1) and an odd number, a new (N−1)×T codeword matrix is generated by deleting the last of the N rows of the N×T codeword matrix and transmitted through the (N−1) transmit antennas for the T symbol periods.

In step 3, a total of m codeword matrices $A_i(\vec{u}_i)$ (m=a×b, a, b≧1) are grouped into b codeword matrix groups each having a codeword matrices, the b codeword matrix groups are transmitted after interleaving or using different sub-carriers, and a codeword matrices in each codeword matrix group are transmitted through n×a (≦N) transmit antennas for $T_0$×a (≦T) symbol periods.

In step 3, other $T_0$×n codeword matrices $B_i(\bullet)$, $C_i(\bullet)$, and $D_i(\bullet)$ generated independently of a total of m $T_0$×n codeword matrices $A_i(\bullet)$ are transmitted in a manner expressed as $$\begin{bmatrix} A_1(\cdot) & B_1(\cdot) & \cdots & C_1(\cdot) & D_1(\cdot) & \cdots & 0_m & 0_m \\ 0_m & A_2(\cdot) & B_2(\cdot) & \cdots & C_2(\cdot) & D_2(\cdot) & \cdots & 0_m \\ \vdots & \vdots & \ddots & \ddots & \ddots & \ddots & \ddots & \vdots \\ 0_m & 0_m & \cdots & A_m(\cdot) & B_m(\cdot) & \cdots & C_m(\cdot) & D_m(\cdot) \end{bmatrix}^T,$$

-continued $$\begin{bmatrix} A_1(\cdot) & B_1(\cdot) & \cdots & C_1(\cdot) & D_1(\cdot) \\ D_2(\cdot) & A_2(\cdot) & B_2(\cdot) & \cdots & C_2(\cdot) \\ \ddots & \ddots & \ddots & \ddots & \ddots \\ \cdots & C_m(\cdot) & D_m(\cdot) & A_m(\cdot) & B_m(\cdot) \end{bmatrix}^T,$$

$$\begin{bmatrix} A_1(\cdot) & B_1(\cdot) & \cdots & C_1(\cdot) & D_1(\cdot) & \cdots \\ A_2(\cdot) & B_2(\cdot) & \cdots & C_2(\cdot) & D_2(\cdot) & \cdots \\ \vdots & \vdots & \cdots & \vdots & \vdots & \cdots \\ A_m(\cdot) & B_m(\cdot) & \cdots & C_m(\cdot) & D_m(\cdot) & \cdots \end{bmatrix}^T$$

$$\begin{bmatrix} A_1(\cdot) & A_2(\cdot) & \cdots & A_m(\cdot) \\ B_1(\cdot) & B_2(\cdot) & \cdots & B_m(\cdot) \\ \vdots & \vdots & \vdots & \vdots \\ C_1(\cdot) & C_2(\cdot) & \cdots & C_m(\cdot) \\ D_1(\cdot) & D_2(\cdot) & \cdots & D_m(\cdot) \end{bmatrix}^T$$

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described in detail herein below with reference to the accompanying drawings. In the following description, well-known functions or constructions are not described in detail because they would obscure the invention in unnecessary detail.

A space-time block coding technique according to the present invention will be described in the context of a wireless communication system using N (an even number, N=m×n, m≧1, n≧2)) transmit antennas and M receiver antennas.

Figure 1:
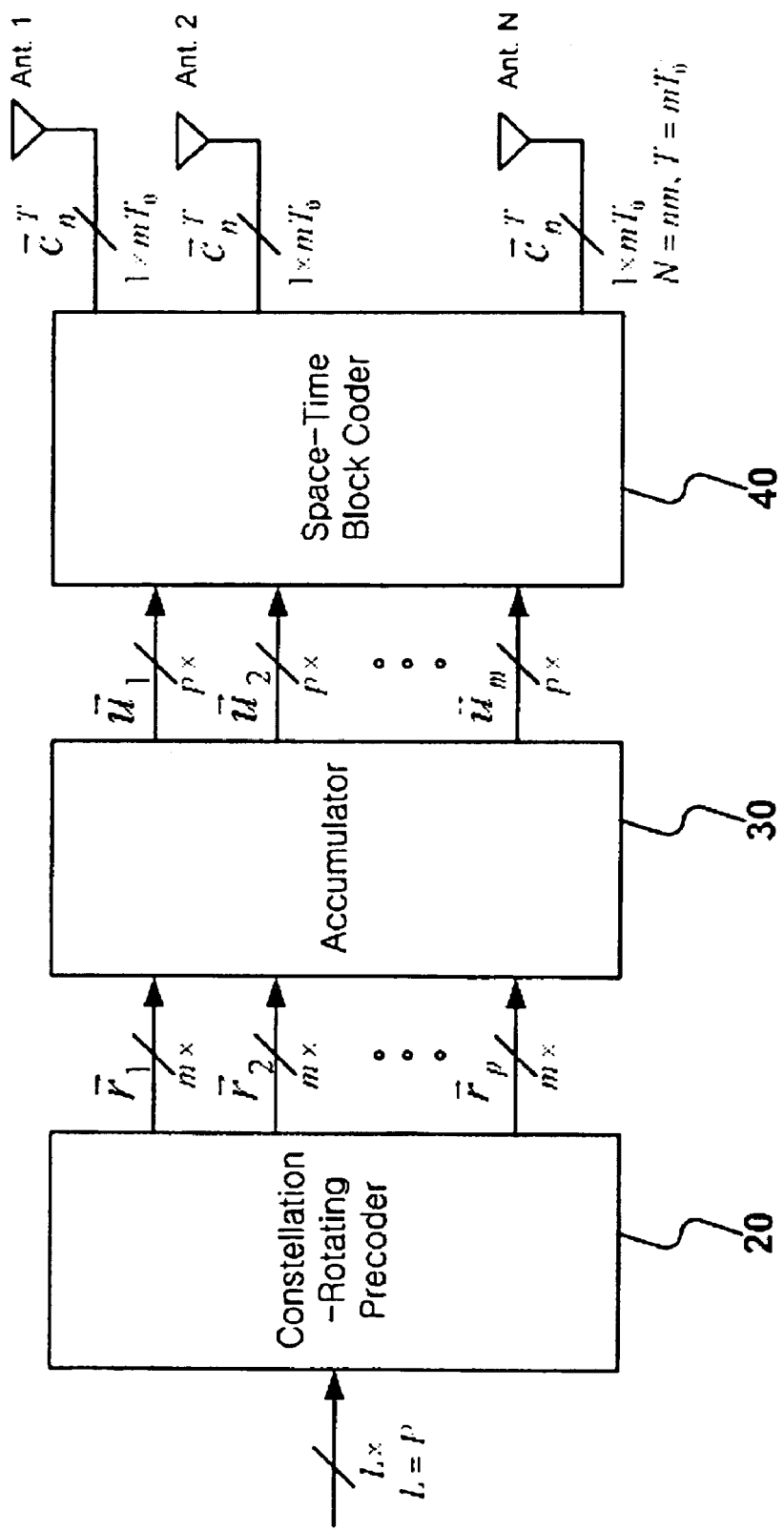
FIG. 1 is a schematic block diagram illustrating a coding apparatus according to a preferred embodiment of the present invention.

FIG. 1 is a schematic block diagram illustrating a coding apparatus according to a preferred embodiment of the present invention. Referring to FIG. 1, the space-time block coding apparatus includes a constellation-rotating precoder 20 for precoding an input signal vector and outputting $m^{th}$-order sub-rotated vectors, an accumulator 30 for generating $p^{th}$-order sub-vectors for the input of the sub-rotated vectors, and a space-time block coder 40 for generating a total of m codeword matrices by space-time coding the sub-vectors, and mapping the codeword matrices to a plurality of antennas.

Figure 2:
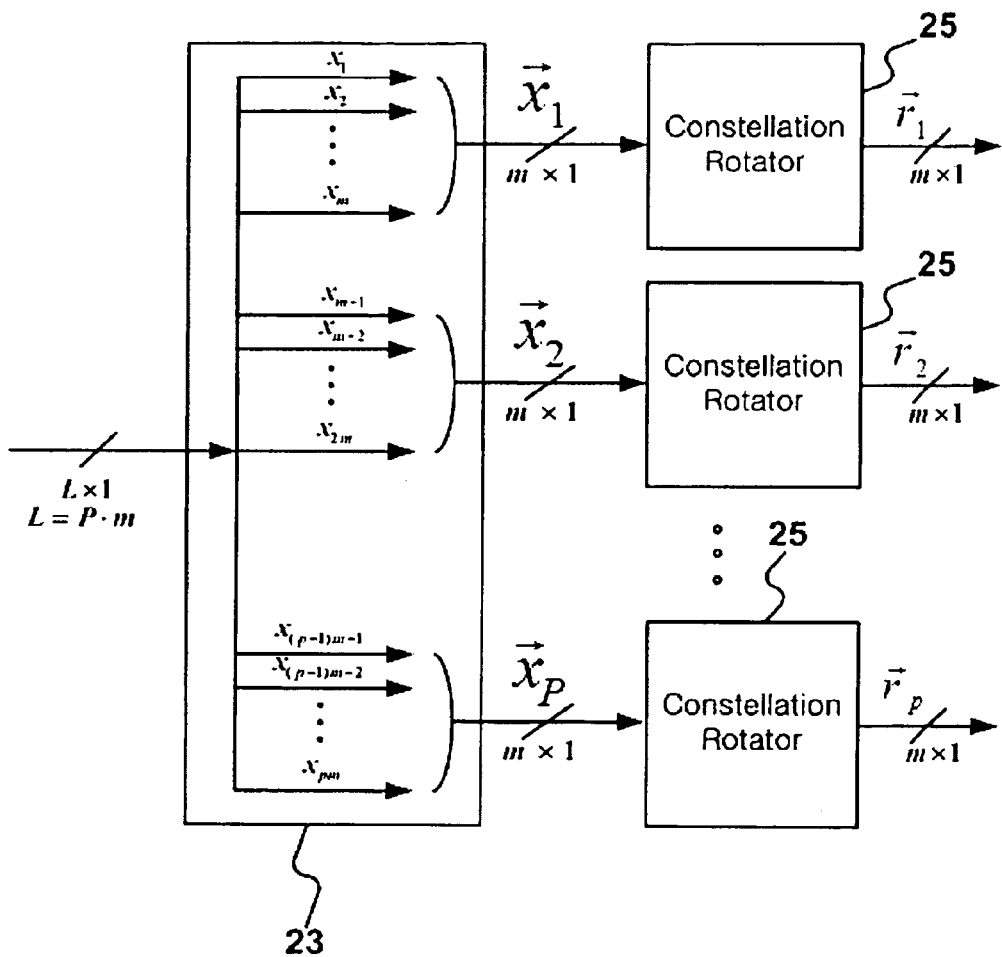
FIG. 2 is a detailed block diagram illustrating a constellation-rotating precoder as illustrated in FIG. 1.

FIG. 2 is a detailed block diagram illustrating the constellation-rotating precoder 20. Referring to FIG. 2, in the constellation-rotating precoder 20, for the input of an $L^{th}$-order vector $\vec{x} = [x_1, \ldots, x_L]^T$ including L(=m×p≦N, p≧2) QAM-modulated signals with Q constellation sizes, an accumulation module 23 generates a total of P $m^{th}$-order sub-input vectors $\vec{x}_i$ (i=1, ..., p) by grouping the L symbols $x_i$ of the input vector, each group having m symbols. Constellation rotators 25 generates a total of P $m^{th}$-order sub-rotated vectors $\vec{r}_i = [r_{i,1}, \ldots, r_{i,m}]$ (i=1, ..., p) by multiplying $\vec{x}_i$ by an m×m constellation-rotating matrix $\Theta$ as follows in Equation (1):

$$\begin{bmatrix} \vec{r}_1 \\ \vec{r}_2 \\ \vdots \\ \vec{r}_p \end{bmatrix} = \begin{bmatrix} \Theta & 0_m & \cdots & 0_m \\ 0_m & \Theta & \cdots & 0_m \\ \vdots & \vdots & \ddots & \vdots \\ 0_m & 0_m & \cdots & \Theta \end{bmatrix} \begin{bmatrix} \vec{x}_1 \\ \vec{x}_2 \\ \vdots \\ \vec{x}_p \end{bmatrix} \quad (1)$$

where $0_m$ denotes an m×m zero matrix.

Figure 3:
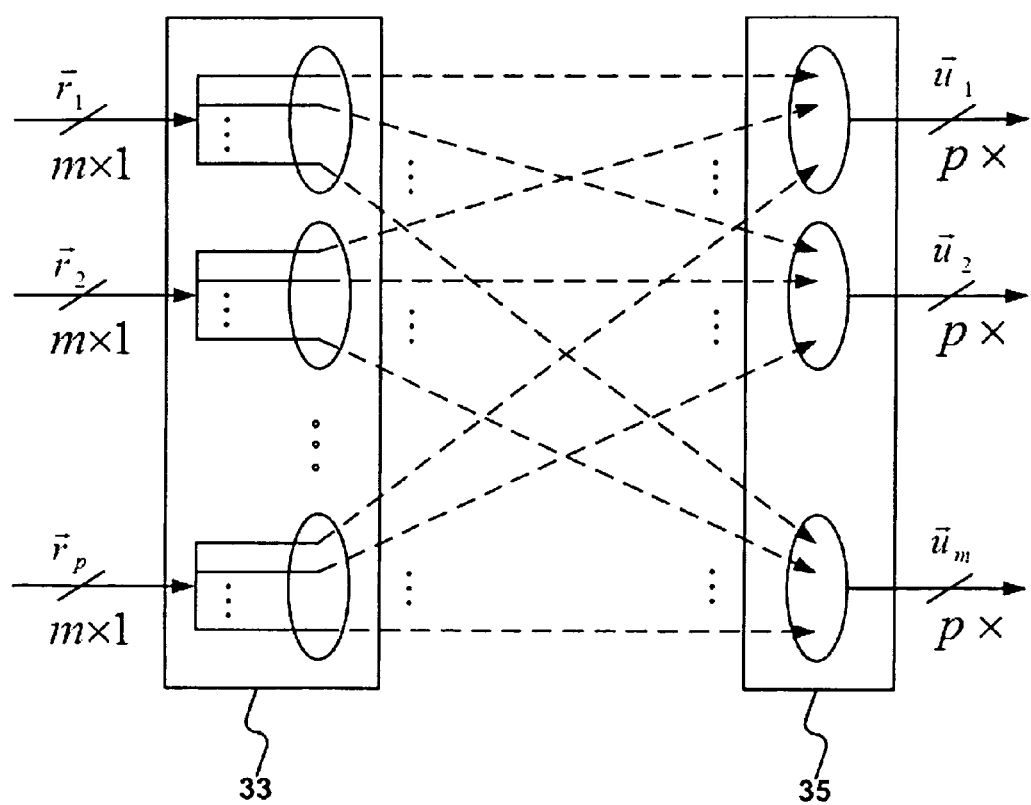
FIG. 3 is a detailed view illustrating a constellation accumulator as illustrated in FIG. 1.

FIG. 3 is a detailed block diagram illustrating the accumulator 30. For the input of the P $m^{th}$-order sub-rotated vectors $\vec{r}_i$, the accumulator 30 generates a total of m $p^{th}$-order sub-vectors $\vec{u}_i$ (i=1, ..., m) by extracting and grouping the individual signals $r_{i,j}$ of each sub-signal vector $\vec{r}_i$, each group having P signals $r_{i,j}$, j=1, ..., p.

Figure 4:
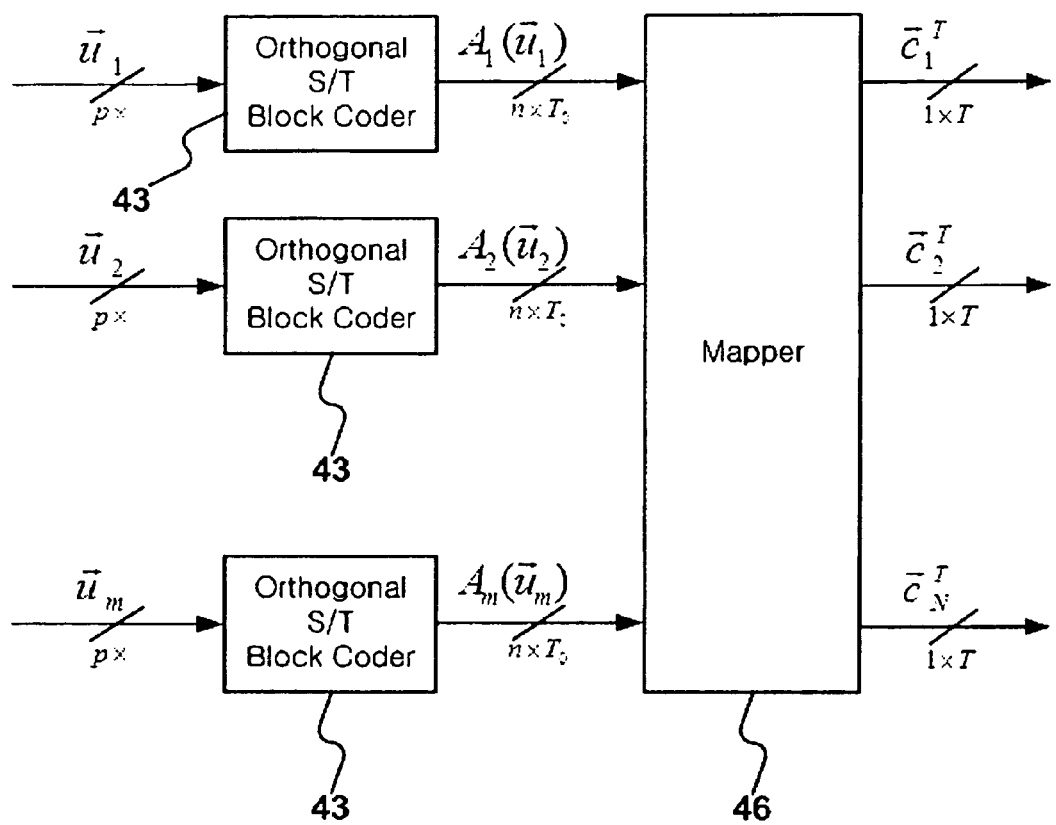
FIG. 4 is a detailed block diagram illustrating a space-time block coder as illustrated in FIG. 1.

FIG. 4 is a detailed block diagram illustrating the space-time block coder 40. Referring to FIG. 4, orthogonal space-time block coders 43 encode the m $p^{th}$-order sub-vectors $\vec{u}_i$ received from the accumulator 30 illustrated in FIG. 3 with respect to $T_0$ symbol periods and n transmit antennas, and generate a total of m n×$T_0$ codeword matrices, $A_i(\vec{u}_i)$ (i=1, ..., m). A mapper 46 maps the m n×$T_0$ codeword matrices such that the n columns of each codeword matrix $A_i(\vec{u}_i)$ are transmitted through n different antennas for each same symbol period of the $T_0$ symbol periods and columns in different codeword matrices $A_i(\vec{u}_i)$ are transmitted through n different antennas for the $T_0$ different symbol periods.

As an example of the above transmission scheme, a T×N codeword matrix $C(\vec{x}) = \{c_{ti}\}$ ($c_{ti}$ is a signal transmitted through an $i^{th}$ transmit antenna at time t) is represented as shown in Equation (2), $$C(\vec{x}) \triangleq [\vec{c}_1, \ldots, \vec{c}_N] \quad (2)$$

$$= \begin{bmatrix} A_1(\vec{u}_1) & 0_{n \times T_0} & \cdots & 0_{n \times T_0} \\ 0_{n \times T_0} & A_2(\vec{u}_2) & \cdots & 0_{n \times T_0} \\ \vdots & \vdots & \ddots & \vdots \\ 0_{n \times T_0} & 0_{n \times T_0} & \cdots & A_m(\vec{u}_m) \end{bmatrix}$$

where $0_{n \times T_0}$ denotes an n×$T_0$ zero matrix and $\vec{c}_i$ denotes an ith column of $C(\vec{x})$.

Assuming that signals transmitted from the N transmit antennas independently experience Raleigh fading and each channel value is unchanged for T symbol periods in which the codeword matrix $C(\vec{x})$ is transmitted, the output $y_{tj}$ of a matched filter for a signal received at a $j^{th}$ receive antenna at time t is shown in Equation (3), $$y_{tj} = \sqrt{E_s} \sum_{i=1}^{N} h_{ij} c_{ti} + z_{tj}, t = 1, \ldots, T, j = 1, \ldots, M \quad (3)$$

where $E_s$ denotes an average symbol energy of signals received at a receiver and $h_{ij}$ denotes a channel fading value from an $i^{th}$ transmit antenna to a $j^{th}$ receive antenna, having an independent, identically distributed (i.i.d.) Gaussian distribution with a zero mean and a 0.5 variance for real and imaginary number parts. $z_{tj}$ is an AWGN (Additive White Gaussian Noise) sample value of the $j^{th}$ receive antenna at time t, having a two-sided power spectral density of $N_0/2$ for real and imaginary number parts each.

Accordingly, a T×M received matrix $Y=\{y_{tj}\}$ with signals received at M receive antennas for T symbol periods is expressed as shown in Equation (4), $$Y = C(\vec{x})H + N \quad (4)$$

where $H=\{h_{ij}\}$ and $Z=\{z_{tj}\}$. H and Z are an N×M channel matrix and a T×M noise matrix, respectively.

ML decoding is performed by selecting an input vector $\hat{x}$ as shown in Equation (5), assuming that the channel matrix H is included in the receiver.

$$\hat{x} = \min_{\vec{x}} \| Y - C(\vec{x})H \| \quad (5)$$

In Equation (5), $\|\bullet\|$ is a Frobenius norm.

When the above ML decoding method is used, the pairwise error probability (PEP) of generating decoding errors by a different codeword matrix $C(\vec{x}')$ with respect to the actual transmitted codeword matrix $C(\vec{x})$ is derived at a high signal-to-noise ratio (SNR) as in Equation (6), $$Pr(C(\vec{x}) \to C(\vec{x}')) \leq \left( \prod_{i=1}^{r} \lambda_i \right)^{-M} \left( \frac{E_s}{4N_0} \right)^{-rM} \quad (6)$$

where r and $\lambda_i$ (i=1, ..., r) are the rank and non-zero eigenvalue of an N×N matrix $S(\vec{x}, \vec{x}') = C(\vec{x} - \vec{x}')^* C(\vec{x} - \vec{x}') = (C(\vec{x}) - C(\vec{x}'))^* (C(\vec{x}) - C(\vec{x}'))$, respectively.

Further, the variable r, which ranges up to N, determines a diversity gain.

$$\prod_{i=1}^{r} \lambda_i$$

in Equation (6) is a coding gain. If the codeword matrix has a maximum diversity gain, $$\prod_{i=1}^{r} \lambda_i$$

is equal to the determinant of $S(\vec{x}, \vec{x}')$.

The constellation-rotating matrix $\Theta$ of Equation (7), which is used in the constellation rotators 25 is designed such that all entry pairs in a new rotated vector pair $(\vec{r}_i, \vec{r}_i')$ for a pair of different sub-input vectors $(\vec{x}_i, \vec{x}_i')$ have different values $r_{i,j}' \neq r_{i,j}'$, $\forall j$, especially in QAM.

$$\Theta = \frac{1}{\sqrt{N}} \begin{bmatrix} 1 & \alpha_0 & \cdots & \alpha_0^{N-1} \\ 1 & \alpha_1 & \cdots & \alpha_1^{N-1} \\ \vdots & \vdots & \ddots & \vdots \\ 1 & \alpha_{N-1} & \cdots & \alpha_{N-1}^{N-1} \end{bmatrix} \quad (7)$$

In Equation (7), $\alpha_i = \exp(j2\pi(i+1/4)/N)$ and $i=0,1,\ldots,N-1$. If the codeword matrix of Equation (2) according to the present invention is transmitted, the determinant of a matrix $A(\vec{x}, \vec{x}')$ for a pair of different input vectors $(\vec{x}, \vec{x}')$ is always greater than 0 because the property of the constellation-rotating matrix $\Theta$ (i.e., $r_{i,j} \neq r_{i,j}'$, $\forall j$). Accordingly, the code of Equation (2) has a maximum diversity order of N for each receive antenna, as shown in Equation (8).

$$\det(S(\vec{x}, \vec{x}')) = \prod_{i=1}^{m} \left( \sum_{l=1}^{p} |r_{l,i} - r_{l,i}'|^2 \right)^n > 0 \quad (8)$$

In Equation (8), $r_{l,i}$ and $r_{l,i}'$ are $i^{th}$ entries of $\vec{r}_l$ and $\vec{r}_l'$, respectively and $\vec{r}_l$ and $\vec{r}_l'$ are the respective sub-rotated vectors of $\vec{x}_l$ and $\vec{x}_l'$.

By multiplying arbitrary N×N unitary matrices U and V, the proposed codeword matrix by the proposed codeword matrix $C(\vec{x})$ at its left and right, $C(\vec{x})$ is changed as in Equation (9).

$$C(\vec{x})' \triangleq UC(\vec{x})V \quad (9)$$

The coding gain of the new codeword matrix $C(\vec{x})'$ for $(\vec{x}, \vec{x}')$ is equal to that of the old codeword matrix $C(\vec{x})$, as easily noted from Equation (10).

$$\det(C(\vec{x} - \vec{x}')'^* C(\vec{x} - \vec{x}')') = \det(V^* C(\vec{x} - \vec{x}')^* U^* U C(\vec{x} - \vec{x}')V) \quad (10)$$
$$= \det(C(\vec{x} - \vec{x}')^* C(\vec{x} - \vec{x}'))$$

$C(\vec{x})$ is transmitted at a duty cycle of 2/N for a signal transmitted through each transmit antenna. While this transmission scheme requires the channel fading condition that the channel status is unchanged only for two successive symbol period, it leads to signal interruption from each transmit antenna. The signal interruption may cause problems in actual system implementation. However, this can be overcome by selecting the two unitary matrices U and V such that all entries of $C(\vec{x})'$ are non-zeroes. For example, when four transmit antennas are given, the orthogonal space-time block coders 43 use Alamouti's code, and a 4×4 identity matrices and a 4×4 Hadamard matrix are used as U and V, respectively, as shown in Equation (11).

$$C(\vec{x})' = \begin{bmatrix} r_1 & r_3 & 0 & 0 \\ -r_3^* & r_1^* & 0 & 0 \\ 0 & 0 & r_2 & r_4 \\ 0 & 0 & -r_4^* & r_2^* \end{bmatrix} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (11)$$

$$= \begin{bmatrix} r_1+r_3 & r_1-r_3 & r_1+r_3 & r_1-r_3 \\ r_1^*-r_3^* & -r_1^*-r_3^* & r_1^*-r_3^* & -r_1^*-r_3^* \\ r_2+r_4 & r_2-r_4 & -r_2-r_4 & -r_2+r_4 \\ r_2^*-r_4^* & -r_2^*-r_4^* & -r_2^*+r_4^* & r_2^*+r_4^* \end{bmatrix}$$

It is confirmed that the above new codeword matrix avoids signal interruption as compared to the codeword matrix of Equation (2).

Especially when N ($=2^n$) transmit antennas are given, the orthogonal space-time block coders 43 use Alamouti's code, and the constellation-rotating matrix of Equation (7) is used, as shown in Equation (12), $$C(\vec{x})' = \begin{bmatrix} I_2 & I_2 & \cdots & I_2 \\ I_2 & \theta & \cdots & \theta^{N-1} \\ \vdots & \vdots & \ddots & \vdots \\ I_2 & \theta^{N-1} & \cdots & \theta^{(N-1)^2} \end{bmatrix}^* \quad (12)$$

$$\begin{bmatrix} C_{Ala}(r_1, r_{N/2+1}) & 0_2 & \cdots & 0_2 \\ 0_2 & C_{Ala}(r_1, r_{N/2+2}) & \cdots & 0_2 \\ \vdots & \vdots & \ddots & \vdots \\ 0_2 & 0_2 & \cdots & C_{Ala}(r_{N/2}, r_N) \end{bmatrix}$$

$$\begin{bmatrix} I_2 & I_2 & \cdots & I_2 \\ I_2 & \theta & \cdots & \theta^{N-1} \\ \vdots & \vdots & \ddots & \vdots \\ I_2 & \theta^{N-1} & \cdots & \theta^{(N-1)^2} \end{bmatrix}$$

$$= \begin{bmatrix} C_{Ala}(s_1, s_{N/2+1}) & C_{Ala}(s_{N/2}, s_N) & \cdots & C_{Ala}(s_2, s_{N/2+2}) \\ C_{Ala}(s_2, s_{N/2+2}) & C_{Ala}(s_1, s_{N/2+1}) & \cdots & C_{Ala}(s_3, s_{N/2+3}) \\ \vdots & \vdots & \ddots & \vdots \\ C_{Ala}(s_{N/2}, s_N) & C_{Ala}(s_{N/2-1}, s_{N-1}) & \cdots & C_{Ala}(s_1, s_{N/2+1}) \end{bmatrix}$$

where $I_2$ is a unitary matrix, $\theta \triangleq \begin{bmatrix} e^{i4\pi/N} & 0 \\ 0 & e^{-i4\pi/N} \end{bmatrix}$, $C_{Ala}(a, b) \triangleq \begin{bmatrix} a & b \\ -b^* & a^* \end{bmatrix}$, and $s_l = e^{i(l-1)\pi/N} x_l$, $s_{N/2+l} = e^{i(l-1)\pi/N} x_{N/2+l}$, $l = 1, \ldots, N/2$.

It is also confirmed that the above new codeword matrix avoids signal interruption as compared to the codeword matrix of Equation (2). A symbol transmitted through each transmit antenna in the new codeword matrix can be represented by a symbol before constellation rotation or a symbol obtained by rotating the pre-constellation rotation symbol at a predetermined angle. Therefore, the transmission symbols of the new codeword matrix have a peak-to-average power ratio (PAPR) equal to that of QAM-modulated symbols before constellation rotation.

The proposed codeword matrix of Equation (2) is used in a wireless communication system having an even number of transmit antennas. For an odd number of transmit antennas, a new (N−1)×T codeword matrix is created by deleting the last column of the N×N codeword matrix of Equation (2). As a result, the (N−1)×T codeword matrix is transmitted through (N−1) transmit antennas for T symbol periods, as shown in Equation (13).

$$C(\vec{x})' \triangleq [\vec{c}_1, \ldots, \vec{c}_{N-1}] \quad (13)$$

For ($\vec{x}, \vec{x}'$), det($S(\vec{x}, \vec{x}')$) of the above codeword matrix is always greater than 0 because the property of the constellation-rotating matrix $\Theta$. Accordingly, the code has a maximum diversity order of N−1 for each receive antenna as shown in Equation (14).

$$\det(S(\vec{x}, \vec{x}')) = \left(\sum_{l=1}^{p} |r_{l,m} - r'_{l,m}|^2\right)^{n-1} \prod_{i=1}^{m-1} \left(\sum_{l=1}^{p} |r_{l,i} - r'_{l,i}|^2\right)^n > 0 \quad (14)$$

The proposed codeword matrix of Equation (2) obtains a maximum diversity order by transmitting the orthogonal space-time block coded m ($=a \times b$, a, b$\geq$1) matrices $A_i(\vec{u}_i)$ through N (an even number) transmit antennas for T symbol periods. It can be further contemplated as another embodiment that the m codeword matrices $A_i(\vec{u}_i)$ are grouped into b codeword matrix groups each having a codeword matrices, the b codeword matrix groups are transmitted after interleaving or using different sub-carriers, and a codeword matrices in each codeword matrix group are transmitted through n×a ($\leq$N) transmit antennas for $T_0 \times a$ ($\leq$T) symbol periods in the manner represented by Equation (2) or Equation (8).

As indicated above, the proposed transmission codeword matrix of Equation (2) is transmitted at a duty cycle of 2/N for a signal through each transmit antenna. Therefore, no signal transmission occurs for (N−2) symbol periods among N symbol periods. Accordingly, other $T_0 \times n$ codeword matrices $B_i(\bullet)$, $C_i(\bullet)$, and $D_i(\bullet)$ (i=1, ..., m) generated independently of $A_i(\bullet)$ for the non-transmission symbol periods are transmitted simultaneously in the following manner, to thereby increase the amount of data transmitted, as shown in Equation (15).

$$\begin{bmatrix} A_1(\cdot) & B_1(\cdot) & \cdots & C_1(\cdot) & D_1(\cdot) & \cdots & 0_m & 0_m \\ 0_m & A_2(\cdot) & B_2(\cdot) & \cdots & C_2(\cdot) & D_2(\cdot) & \cdots & 0_m \\ \vdots & \vdots & \ddots & \ddots & \ddots & \ddots & \ddots & \vdots \\ 0_m & 0_m & \cdots & A_m(\cdot) & B_m(\cdot) & \cdots & C_m(\cdot) & D_m(\cdot) \end{bmatrix}^T \quad (15)$$

$$\begin{bmatrix} A_1(\cdot) & B_1(\cdot) & \cdots & C_1(\cdot) & D_1(\cdot) \\ D_2(\cdot) & A_2(\cdot) & B_2(\cdot) & \cdots & C_2(\cdot) \\ \ddots & \ddots & \ddots & \ddots & \ddots \\ \cdots & C_m(\cdot) & D_m(\cdot) & A_m(\cdot) & B_m(\cdot) \end{bmatrix}^T,$$

$$\begin{bmatrix} A_1(\cdot) & B_1(\cdot) & \cdots & C_1(\cdot) & D_1(\cdot) & \cdots \\ A_2(\cdot) & B_2(\cdot) & \cdots & C_2(\cdot) & D_2(\cdot) & \cdots \\ \vdots & \vdots & \cdots & \vdots & \vdots & \cdots \\ A_m(\cdot) & B_m(\cdot) & \cdots & C_m(\cdot) & D_m(\cdot) & \cdots \end{bmatrix}^T$$

-continued
$$\begin{bmatrix} A_1(\cdot) & A_2(\cdot) & \cdots & A_m(\cdot) \\ B_1(\cdot) & B_2(\cdot) & \cdots & B_m(\cdot) \\ \vdots & \vdots & \vdots & \vdots \\ C_1(\cdot) & C_2(\cdot) & \cdots & C_m(\cdot) \\ D_1(\cdot) & D_2(\cdot) & \cdots & D_m(\cdot) \end{bmatrix}^T$$

The coding apparatus of the present invention is configured to have a constellation-rotating precoder and an orthogonal space-time block coder, which are serially concatenated. Therefore, a maximum diversity gain can be achieved even when QAM is utilized as a modulation scheme and at least two transmit antennas are used.

Also, the coding technique of the present invention offers a maximum coding gain by use of Alamouti's code as an orthogonal space-time block code.

The coding technique of the present invention performs constellation-rotating precoding and orthogonal space-time block coding on a transmission signal. As a result, a maximum diversity gain is achieved and ML decoding is possible.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A transmitter for transmitting data through a plurality of transmit antennas in a wireless communication system including the transmitter and a receiver for receiving the data through a plurality of receive antennas, the transmitter comprising:

a constellation-rotating precoder for generating P $m^{th}$-order sub-rotated vectors $\vec{r}_i$ by constellation-rotating an $L^{th}$-order input vector $\vec{x}$ including a plurality of input symbols modulated in at least one modulation scheme;

an accumulator for generating m $p^{th}$-order sub-vectors $\vec{u}_i$ using the sub-rotated vectors $\vec{r}_i$; and a space-time block coder for generating codeword matrices $A_i(\vec{u}_i)$ by performing orthogonal space-time block coding on the sub-vectors $\vec{u}_i$.

2. The transmitter of claim 1, wherein the constellation-rotating precoder comprises:

a first accumulation module for generating P $m^{th}$-order sub-input vectors $\vec{x}_i$ by grouping the symbols of the input vector $\vec{x}$ into P groups, each having m symbols, and outputting the P $m^{th}$-order sub-input vectors $\vec{x}_i$ in parallel; and a plurality of constellation rotators for generating the P $m^{th}$-order sub-rotated vectors $\vec{r}_i$ by multiplying the parallel P $m^{th}$-order sub-input vectors $\vec{x}_i$ by a constellation-rotating matrix $\Theta$.

3. The transmitter of claim 2, wherein the accumulator comprises:

a plurality of extraction modules for extracting signals $r_{i,j}$ included in each of the sub-rotated vectors $\vec{r}_i$ received from the constellation-rotating precoder; and a second accumulation module for generating the m $p^{th}$-order sub-vectors $\vec{u}_i$ by grouping the extracted signals $r_{i,j}$.

4. The transmitter of claim 1, wherein the accumulator comprises:

a plurality of extraction modules for extracting signals $r_{i,j}$ included in each of the sub-rotated vectors $\vec{r}_i$ received from the constellation-rotating precoder; and a second accumulation module for generating the m $p^{th}$-order sub-vectors $\vec{u}_i$ by grouping the extracted signals $r_{i,j}$.

5. The transmitter of claim 4, wherein the space-time block coder comprises:

a plurality of orthogonal space-time coder modules for generating the codeword matrices $A_i(\vec{u}_i)$ by performing orthogonal space-time block coding on the sub-vectors $\vec{u}_i$ received from the second accumulation module; and a mapper for mapping the codeword matrices $A_i(\vec{u}_i)$ to the plurality of the transmit antennas.

6. The transmitter of claim 1, wherein the space-time block coder comprises:

a plurality of orthogonal space-time coder modules for generating the codeword matrices $A_i(\vec{u}_i)$ by performing orthogonal space-time block coding on the sub-vectors $\vec{u}_i$ received from the accumulator; and a mapper for mapping the codeword matrices $A_i(\vec{u}_i)$ to the plurality of the transmit antennas.

7. The transmitter of claim 6, wherein the space-time block coder transmits columns of each of the codeword matrices $A_i(\vec{u}_i)$ through different transmit antennas for a same symbol period, and transmits columns of different codeword matrices $A_i(\vec{u}_i)$ through different transmit antennas for different symbol periods.

8. The transmitter of claim 6, wherein the mapper maps a total of n columns of each of the codeword matrices $A_i(\vec{u}_i)$ to different transmit antennas for the same symbol period and columns in different codeword matrices $A_i(\vec{u}_i)$ to different transmit antennas for different symbol periods.

9. The transmitter of claim 1, wherein a T×N codeword matrix $C(\vec{x}) = \{c_n\}$ having the codeword matrices $A_i(\vec{u}_i)$ as entries is formed as:

$$C(\vec{x}) \triangleq [\vec{c}_1, \ldots, \vec{c}_N]$$
$$= \begin{bmatrix} A_1(\vec{u}_1) & 0_{n \times T_0} & \cdots & 0_{n \times T_0} \\ 0_{n \times T_0} & A_2(\vec{u}_2) & \cdots & 0_{n \times T_0} \\ \vdots & \vdots & \ddots & \vdots \\ 0_{n \times T_0} & 0_{n \times T_0} & \cdots & A_m(\vec{u}_m) \end{bmatrix}$$

where $0_{n \times T_0}$ denotes an n×$T_0$ zero matrix and $\vec{c}_i$ denotes an ith column of $C(\vec{x})$.

10. The transmitter of claim 9, wherein the space-time block coder generates a modified T×N codeword matrix $$C(\vec{x})' \triangleq UC(\vec{x})V$$

by multiplying the codeword matrix $C(\vec{x})$ by a T×T unitary matrix U and an N×N unitary matrix V at a left and right of $C(\vec{x})$, and transmits the modified codeword matrix through N transmit antennas for T symbol periods.

11. The transmitter of claim 10, wherein N=$2^n$, the space-time block coder uses Alamouti's code, and the constellation-rotating precoder uses a matrix expressed as:

$$\Theta = \frac{1}{\sqrt{N}} \begin{bmatrix} 1 & \alpha_0 & \cdots & \alpha_0^{N-1} \\ 1 & \alpha_1 & \cdots & \alpha_1^{N-1} \\ \vdots & \vdots & \ddots & \vdots \\ 1 & \alpha_{N-1} & \cdots & \alpha_{N-1}^{N-1} \end{bmatrix},$$

$\alpha_i = \exp(j2\pi(i+1/4)/N)$ and $i=0,1,\ldots,N-1$.

12. The transmitter of claim 11, wherein the unitary matrix U is expressed as:

$$U = \begin{bmatrix} I_2 & I_2 & I_2 & \cdots & I_2 \\ I_2 & \theta & \theta^2 & \cdots & \theta^{N-1} \\ I_2 & \theta^2 & \theta^4 & \cdots & \theta^{(N-1)2} \\ \vdots & \vdots & \vdots & \ddots & \vdots \\ I_2 & \theta^{N-1} & \theta^{2(N-1)} & \cdots & \theta^{(N-1)2} \end{bmatrix},$$

and the matrix V is expressed as:

$$V = \begin{bmatrix} I_2 & I_2 & I_2 & \cdots & I_2 \\ I_2 & \theta & \theta^2 & \cdots & \theta^{N-1} \\ I_2 & \theta^2 & \theta^4 & \cdots & \theta^{(N-1)2} \\ \vdots & \vdots & \vdots & \ddots & \vdots \\ I_2 & \theta^{N-1} & \theta^{2(N-1)} & \cdots & \theta^{(N-1)2} \end{bmatrix},$$

where $I_2$ is a 2×2 unitary matrix and $$\theta \triangleq \begin{bmatrix} e^{i4\pi/N} & 0 \\ 0 & e^{-i4\pi/N} \end{bmatrix}.$$

13. The transmitter of claim 12, wherein the codeword matrix $C(\vec{x})^{40} \triangleq UC(\vec{x})V$ is formed as:

$$C(\vec{x})' = U \begin{bmatrix} C_{Ala}(r_1, r_{N/2+1}) & 0_2 & \cdots & 0_2 \\ 0_2 & C_{Ala}(r_1, r_{N/2+2}) & \cdots & 0_2 \\ \vdots & \vdots & \ddots & \vdots \\ 0_2 & 0_2 & \cdots & C_{Ala}(r_{N/2}, r_N) \end{bmatrix} V$$

$$= \begin{bmatrix} C_{Ala}(s_1, s_{N/2+1}) & C_{Ala}(s_{N/2}, s_N) & \cdots & C_{Ala}(s_2, s_{N/2+2}) \\ C_{Ala}(s_2, s_{N/2+2}) & C_{Ala}(s_1, s_{N/2+1}) & \cdots & C_{Ala}(s_3, s_{N/2+3}) \\ \vdots & \vdots & \ddots & \vdots \\ C_{Ala}(s_{N/2}, s_N) & C_{Ala}(s_{N/2-1}, s_{N-1}) & \cdots & C_{Ala}(s_1, s_{N/2+1}) \end{bmatrix}$$

where $C_{Ala}(a, b) \triangleq \begin{bmatrix} a & b \\ -b^* & a^* \end{bmatrix}$, $s_l = e^{i(l-1)\pi/N} x_l$, and $s_{N/2+l} = e^{i(l-1)\pi/N} x_{N/2+l}$ $(l = 1, \ldots, N/2)$.

14. The transmitter of claim 9, wherein the space-time block coder simultaneously transmits other $T_0 \times n$ codeword matrices $B_i(\bullet)$, $C_i(\bullet)$, and $D_i(\bullet)$ generated independently of a total of m $T_0 \times n$ codeword matrices $A_i(\bullet)$ in a manner expressed as $$\begin{bmatrix} A_1(\cdot) & B_1(\cdot) & \cdots & C_1(\cdot) & D_1(\cdot) & \cdots & 0_m & 0_m \\ 0_m & A_2(\cdot) & B_2(\cdot) & \cdots & C_2(\cdot) & D_2(\cdot) & \cdots & 0_m \\ \vdots & \vdots & \ddots & \ddots & \ddots & \ddots & \ddots & \vdots \\ 0_m & 0_m & \cdots & A_m(\cdot) & B_m(\cdot) & \cdots & C_m(\cdot) & D_m(\cdot) \end{bmatrix}^T,$$

$$\begin{bmatrix} A_1(\cdot) & B_1(\cdot) & \cdots & C_1(\cdot) & D_1(\cdot) \\ D_2(\cdot) & A_2(\cdot) & B_2(\cdot) & \cdots & C_2(\cdot) \\ \ddots & \ddots & \ddots & \ddots & \ddots \\ \cdots & C_m(\cdot) & D_m(\cdot) & A_m(\cdot) & B_m(\cdot) \end{bmatrix}^T,$$

$$\begin{bmatrix} A_1(\cdot) & B_1(\cdot) & \cdots & C_1(\cdot) & D_1(\cdot) & \cdots \\ A_2(\cdot) & B_2(\cdot) & \cdots & C_2(\cdot) & D_2(\cdot) & \cdots \\ \vdots & \vdots & \cdots & \vdots & \vdots & \cdots \\ A_m(\cdot) & B_m(\cdot) & \cdots & C_m(\cdot) & D_m(\cdot) & \cdots \end{bmatrix}^T,$$

$$\begin{bmatrix} A_1(\cdot) & A_2(\cdot) & \cdots & A_m(\cdot) \\ B_1(\cdot) & B_2(\cdot) & \cdots & B_m(\cdot) \\ \vdots & \vdots & \vdots & \vdots \\ C_1(\cdot) & C_2(\cdot) & \cdots & C_m(\cdot) \\ D_1(\cdot) & D_2(\cdot) & \cdots & D_m(\cdot) \end{bmatrix}^T.$$

15. The transmitter of claim 1, wherein if a number of the transmit antennas is (N−1) being an odd number, the space-time block coder generates a new (N−1)×T codeword matrix by deleting a last of N rows of the N×T codeword matrix and transmits the (N−1)×T codeword matrix through (N−1) transmit antennas for the T symbol periods.

16. The transmitter of claim 1, wherein the space-time block coder groups a total of m codeword matrices $A_i(\vec{u}_i)$, where m=a×b, a, and b≧1 into b codeword matrix groups, each having a codeword matrix, transmits the b codeword matrix groups after one of interleaving and using different sub-carriers, and transmits a codeword matrix in each codeword matrix group through n×a (≦N) transmit antennas for $T_0 \times a$ (≦T) symbol periods.

17. A transmitter for transmitting data through a plurality of transmit antennas in a wireless communication system including the transmitter and a receiver for receiving the data through a plurality of receive antennas, comprising:

a constellation-rotating precoder for generating P $m^{th}$-order sub-rotated vectors $\vec{r}_i$ (i=1,…,m) by constellation-rotating an input vector $\vec{x}$ including L (=p×m≦N, p≧2) quadrature amplitude modulation (QAM) signals having Q constellation sizes;

an accumulator for grouping the L QAM signals $r_i$ (i=1, …, L) into m signal groups $\vec{u}_i$ (i=1, …, m) each having p signals; and a space-time block coder for generating m n×$T_0$ codeword matrices $A_i(\vec{u}_i)$ (i=1,2,…,m) by encoding the m signal groups $\vec{u}_i$, forming a T×N codeword matrix $C(\vec{x})$ using the n×T$_0$ codeword matrices $A_i(\vec{u}_i)$, and transmitting the T×N codeword matrix $C(\vec{x})$ through N transmit antennas for T (=T$_0$×m) symbol periods.

18. The transmitter of claim 17, wherein the space-time block coder transmits n columns of each codeword matrix $A_i(\vec{u}_i)$ through n different antennas for each same symbol period of the T$_0$ symbol periods and columns in different codeword matrices $A_i(\vec{u}_i)$ through n different antennas for the T$_0$ different symbol periods.

19. The transmitter of claim 17, wherein the space-time block coder generates a modified T×N codeword matrix $$C(\vec{x})' \triangleq U C(\vec{x}) V$$

by multiplying the codeword matrix $C(\vec{x})$ by a T×T unitary matrix U and an N×N unitary matrix V at a left and right of $C(\vec{x})$, and transmits the modified codeword matrix through the N transmit antennas for the T symbol periods.

20. The transmitter of claim 19, wherein N=2$^n$, the space-time block coder uses Alamouti's code, and the constellation-rotating precoder uses a matrix expressed as:

$$\Theta = \frac{1}{\sqrt{N}}\begin{bmatrix} 1 & \alpha_0 & \cdots & \alpha_0^{N-1} \\ 1 & \alpha_1 & \cdots & \alpha_1^{N-1} \\ \vdots & \vdots & \ddots & \vdots \\ 1 & \alpha_{N-1} & \cdots & \alpha_{N-1}^{N-1} \end{bmatrix},$$

$\alpha_i = \exp(j2\pi(i+1/4)/N)$ and $i=0,1,\ldots,N-1$.

21. The transmitter of claim 20, wherein the unitary matrix U is expressed as:

$$U = \begin{bmatrix} I_2 & I_2 & I_2 & \cdots & I_2 \\ I_2 & \theta & \theta^2 & \cdots & \theta^{N-1} \\ I_2 & \theta^2 & \theta^4 & \cdots & \theta^{(N-1)2} \\ \vdots & \vdots & \vdots & \ddots & \vdots \\ I_2 & \theta^{N-1} & \theta^{2(N-1)} & \cdots & \theta^{(N-1)^2} \end{bmatrix}$$

and the unitary matrix V is expressed as:

$$V = \begin{bmatrix} I_2 & I_2 & I_2 & \cdots & I_2 \\ I_2 & \theta & \theta^2 & \cdots & \theta^{N-1} \\ I_2 & \theta^2 & \theta^4 & \cdots & \theta^{(N-1)2} \\ \vdots & \vdots & \vdots & \ddots & \vdots \\ I_2 & \theta^{N-1} & \theta^{2(N-1)} & \cdots & \theta^{(N-1)^2} \end{bmatrix}$$

where $I_2$ is a 2×2 unitary matrix and $$\theta \triangleq \begin{bmatrix} e^{i4\pi/N} & 0 \\ 0 & e^{-i4\pi/N} \end{bmatrix}.$$

22. The transmitter of claim 21, wherein the codeword matrix $$C(\vec{x})' \triangleq U C(\vec{x}) V$$

is formed as:

$$C(\vec{x})' = U \begin{bmatrix} C_{Ala}(r_1, r_{N/2+1}) & 0_2 & \cdots & 0_2 \\ 0_2 & C_{Ala}(r_1, r_{N/2+2}) & \cdots & 0_2 \\ \vdots & \vdots & \ddots & \vdots \\ 0_2 & 0_2 & \cdots & C_{Ala}(r_{N/2}, r_N) \end{bmatrix} V$$

$$= \begin{bmatrix} C_{Ala}(s_1, s_{N/2+1}) & C_{Ala}(s_{N/2}, s_N) & \cdots & C_{Ala}(s_2, s_{N/2+2}) \\ C_{Ala}(s_2, s_{N/2+2}) & C_{Ala}(s_1, s_{N/2+1}) & \cdots & C_{Ala}(s_3, s_{N/2+3}) \\ \vdots & \vdots & \ddots & \vdots \\ C_{Ala}(s_{N/2}, s_N) & C_{Ala}(s_{N/2-1}, s_{N-1}) & \cdots & C_{Ala}(s_1, s_{N/2+1}) \end{bmatrix}$$

where $$C_{Ala}(a, b) \triangleq \begin{bmatrix} a & b \\ -b^* & a^* \end{bmatrix}, \quad s_l = e^{i(l-1)\pi/N} x_l, \text{ and}$$

$$s_{N/2+l} = e^{i(l-1)\pi/N} x_{N/2+l} \quad (l = 1, \cdots, N/2).$$

23. The transmitter of claim 17, wherein if a number of the transmit antennas is (N−1) being an odd number, the space-time block coder generates a new (N−1)×T codeword matrix by deleting a last of N rows of the N×T codeword matrix and transmits the (N−1)×T codeword matrix through (N−1) transmit antennas for the T symbol periods.

24. The transmitter of claim 17, wherein the space-time block coder groups the m codeword matrices $A_i(\vec{u}_i)$, where m=a×b, a and b≧1, into b codeword matrix groups, each having a codeword matrix, transmits the b codeword matrix groups after one of interleaving and using different sub-carriers, and transmits a codeword matrix in each codeword matrix group through n×a (≦N) transmit antennas for T$_0$×a (≦T) symbol periods.

25. A coding method in a wireless communication system including a transmitter for transmitting data through a plurality of transmit antennas and a receiver for receiving the data through a plurality of receive antennas, comprising:

(a) generating P m$^{th}$-order sub-rotated vectors $\vec{r}_i$ by constellation-rotating an L$^{th}$-order input vector $\vec{x}$ including a plurality of input symbols modulated in at least one modulation scheme;

(b) generating m p$^{th}$-order sub-vectors $\vec{u}_i$ using the sub-rotated vectors $\vec{r}_i$; and (c) generating codeword matrices $A_i(\vec{u}_i)$ by performing orthogonal space-time block coding on the sub-vectors $\vec{u}_i$.

26. The coding method of claim 25, wherein the step (a) comprises the steps of:

generating P $m^{th}$-order sub-input vectors $\vec{x}_i$ by grouping the symbols of the input vector $\vec{x}$ into P groups, each having m symbols, and outputting the P $m^{th}$-order sub-input vectors $\vec{x}_i$ in parallel; and generating the P $m^{th}$-order sub-rotated vectors $\vec{r}_i$ by multiplying the parallel P $m^{th}$-order sub-input vectors $\vec{x}_i$ by a constellation-rotating matrix $\Theta$.

27. The coding method of claim 26, wherein the step (b) comprises the step of:

extracting signals $r_{i,j}$ included in each of the sub-rotated vectors $\vec{r}_i$; and generating the m $p^{th}$-order sub-vectors $\vec{u}_i$ by grouping the extracted signals $r_{i,j}$.

28. The coding method of claim 27, wherein the step of (c) comprises the steps of:

generating the codeword matrices $A_i(\vec{u}_i)$ by performing orthogonal space-time block coding on the sub-vectors $\vec{u}_i$; and mapping the codeword matrices $A_i(\vec{u}_i)$ to the plurality of the transmit antennas.

29. The coding method of claim 25, wherein the step (b) comprises the steps of:

extracting signals $r_{i,j}$ included in each of the sub-rotated vectors $\vec{r}$; and generating the m $p^{th}$-order sub-vectors $\vec{u}_i$ by grouping the extracted signals $r_{i,j}$.

30. The coding method of claim 25, wherein the step (c) comprises the steps of:

generating the codeword matrices $A_i(\vec{u}_i)$ by performing orthogonal space-time block coding on the sub-vectors $\vec{u}_i$; and mapping the codeword matrices $A_i(\vec{u}_i)$ to the plurality of the transmit antennas.

31. The coding method of claim 30, wherein the step (c) further comprises the steps of:

transmitting columns of each of the codeword matrices $A_i(\vec{u}_i)$ through different transmit antennas for a same symbol period; and transmitting columns of different codeword matrices $A_i(\vec{u}_i)$ through different transmit antennas for different symbol periods.

32. The coding method of claim 25, wherein the step (c) comprises the step of generating a T×N codeword matrix $C(\vec{x})$ using the codeword matrices $A_i(\vec{u}_i)$, to be transmitted for N transmit antennas for T symbol periods.

33. The coding method of claim 32, wherein the T×N codeword matrix $C(\vec{x})$ is formed as:

$$C(\vec{x}) \triangleq [\vec{c}_1, \cdots, \vec{c}_N]$$

-continued $$= \begin{bmatrix} A_1(\vec{u}_1) & 0_{n \times T_0} & \cdots & 0_{n \times T_0} \\ 0_{n \times T_0} & A_2(\vec{u}_2) & \cdots & 0_{n \times T_0} \\ \vdots & \vdots & \ddots & \vdots \\ 0_{n \times T_0} & 0_{n \times T_0} & \cdots & A_m(\vec{u}_m) \end{bmatrix}$$

where $0_{n \times T_0}$ denotes an n×$T_0$ zero matrix and $\vec{c}_i$ denotes an ith column of $C(\vec{x})$.

34. The coding method of claim 33, wherein the step (c) comprises the steps of:

if the number of the transmit antennas is (N−1) being an odd number, generating a new (N−1)×T codeword matrix by deleting the last of N rows of the N×T codeword matrix; and transmitting the (N−1)×T codeword matrix through (N−1) transmit antennas for the T symbol periods.

35. The coding method of claim 33, wherein the step (c) comprises the steps of:

grouping a total of m codeword matrices $A_i(\vec{u}_i)$, where m=a×b, a, and b≧1, into b codeword matrix groups each having a codeword matrix;

transmitting the b codeword matrix groups after interleaving or using different sub-carriers; and transmitting a codeword matrices in each codeword matrix group through n×a (≦N) transmit antennas for $T_0$×a (≦T) symbol periods.

36. The coding method of claim 33, wherein the step (c) comprises the step of simultaneously transmitting other $T_0$×n codeword matrices $B_i(\bullet)$, $C_i(\bullet)$, and $D_i(\bullet)$ generated independently of a total of m $T_0$×n codeword matrices $A_i(\bullet)$ in a manner expressed as:

$$\begin{bmatrix} A_1(\cdot) & B_1(\cdot) & \cdots & C_1(\cdot) & D_1(\cdot) & \cdots & 0_m & 0_m \\ 0_m & A_2(\cdot) & B_2(\cdot) & \cdots & C_2(\cdot) & D_2(\cdot) & \cdots & 0_m \\ \vdots & \vdots & \ddots & \ddots & \ddots & \ddots & \ddots & \vdots \\ 0_m & 0_m & \cdots & A_m(\cdot) & B_m(\cdot) & \cdots & C_m(\cdot) & D_m(\cdot) \end{bmatrix}^T,$$

$$\begin{bmatrix} A_1(\cdot) & B_1(\cdot) & \cdots & C_1(\cdot) & D_1(\cdot) \\ D_2(\cdot) & A_2(\cdot) & B_2(\cdot) & \cdots & C_2(\cdot) \\ \ddots & \ddots & \ddots & \ddots & \ddots \\ \cdots & C_m(\cdot) & D_m(\cdot) & A_m(\cdot) & B_m(\cdot) \end{bmatrix}^T,$$

$$\begin{bmatrix} A_1(\cdot) & B_1(\cdot) & \cdots & C_1(\cdot) & D_1(\cdot) & \cdots \\ A_2(\cdot) & B_2(\cdot) & \cdots & C_2(\cdot) & D_2(\cdot) & \cdots \\ \vdots & \vdots & \cdots & \vdots & \vdots & \cdots \\ A_m(\cdot) & B_m(\cdot) & \cdots & C_m(\cdot) & D_m(\cdot) & \cdots \end{bmatrix}^T$$

$$\begin{bmatrix} A_1(\cdot) & A_2(\cdot) & \cdots & A_m(\cdot) \\ B_1(\cdot) & B_2(\cdot) & \cdots & B_m(\cdot) \\ \vdots & \vdots & \vdots & \vdots \\ C_1(\cdot) & C_2(\cdot) & \cdots & C_m(\cdot) \\ D_1(\cdot) & D_2(\cdot) & \cdots & D_m(\cdot) \end{bmatrix}^T.$$

37. The coding method of claim 32, wherein the step (c) further comprises the step of generating a modified T×N codeword matrix $$C(\vec{x})' \triangleq U C(\vec{x}) V$$

by multiplying the codeword matrix $C(\vec{x})$ by a T×T unitary matrix U and an N×N unitary matrix V at a left and right of $C(\vec{x})$, and transmitting the modified codeword matrix through the N transmit antennas for the T symbol periods.

38. The coding method of claim 37, wherein $N=2^n$, Alamouti's code is used for the orthogonal space-time block coding, and $$\Theta = \frac{1}{\sqrt{N}} \begin{bmatrix} 1 & \alpha_0 & \cdots & \alpha_0^{N-1} \\ 1 & \alpha_1 & \cdots & \alpha_1^{N-1} \\ \vdots & \vdots & \ddots & \vdots \\ 1 & \alpha_{N-1} & \cdots & \alpha_{N-1}^{N-1} \end{bmatrix},$$

is used for the constellation rotation, the following matrix is used, $\alpha_i = \exp(j2\pi(i+1/4)/N)$ and $i=0,1,\ldots,N-1$.

39. The coding method of claim 38, wherein the unitary matrix U is expressed as:

$$U = \begin{bmatrix} I_2 & I_2 & I_2 & \cdots & I_2 \\ I_2 & \theta & \theta^2 & \cdots & \theta^{N-1} \\ I_2 & \theta^2 & \theta^4 & \cdots & \theta^{(N-1)2} \\ \vdots & \vdots & \vdots & \ddots & \vdots \\ I_2 & \theta^{N-1} & \theta^{2(N-1)} & \cdots & \theta^{(N-1)2} \end{bmatrix},$$

and the unitary matrix V is expressed as:

$$V = \begin{bmatrix} I_2 & I_2 & I_2 & \cdots & I_2 \\ I_2 & \theta & \theta^2 & \cdots & \theta^{N-1} \\ I_2 & \theta^2 & \theta^4 & \cdots & \theta^{(N-1)2} \\ \vdots & \vdots & \vdots & \ddots & \vdots \\ I_2 & \theta^{N-1} & \theta^{2(N-1)} & \cdots & \theta^{(N-1)2} \end{bmatrix},$$

where $I_2$ is a 2×2 unitary matrix and $$\theta \triangleq \begin{bmatrix} e^{i4\pi/N} & 0 \\ 0 & e^{-i4\pi/N} \end{bmatrix}.$$

40. The coding method of claim 39, wherein the codeword matrix $$C(\vec{x})' \triangleq UC(\vec{x})V$$

is formed as:

$$C(\vec{x})' = U \begin{bmatrix} C_{Ala}(r_1, r_{N/2+1}) & 0_2 & \cdots & 0_2 \\ 0_2 & C_{Ala}(r_1, r_{N/2+2}) & \cdots & 0_2 \\ \vdots & \vdots & \ddots & \vdots \\ 0_2 & 0_2 & \cdots & C_{Ala}(r_{N/2}, r_N) \end{bmatrix} V$$

$$= \begin{bmatrix} C_{Ala}(s_1, s_{N/2+1}) & C_{Ala}(s_{N/2}, s_N) & \cdots & C_{Ala}(s_2, s_{N/2+2}) \\ C_{Ala}(s_2, s_{N/2+2}) & C_{Ala}(s_1, s_{N/2+1}) & \cdots & C_{Ala}(s_3, s_{N/2+3}) \\ \vdots & \vdots & \ddots & \vdots \\ C_{Ala}(s_{N/2}, s_N) & C_{Ala}(s_{N/2-1}, s_{N-1}) & \cdots & C_{Ala}(s_1, s_{N/2+1}) \end{bmatrix}$$

where $$C_{Ala}(a,b) \triangleq \begin{bmatrix} a & b \\ -b^* & a^* \end{bmatrix}, \quad s_l = e^{i(l-1)\pi/N} x_l, \text{ and}$$

$$s_{N/2+l} = e^{i(l-1)\pi/N} x_{N/2+l} \quad (l=1,\cdots,N/2).$$

* * * * *